UNITED STATES PATENT OFFICE 2,389,647

CHEMICAL PROCESS AND PRODUCT

Frank J. Soday, Swarthmore, Pa., assignor to The United Gas Improvement Company, a corporation of Pennsylvania No Drawing. Application October 17, 1942, Serial No. 462,412

9 Claims. (Cl. 260—680)

This invention relates to the recovery in more highly concentrated and/or pure form of butadiene from mixtures containing the same.

More particularly, this invention is concerned with the recovery of butadiene from mixtures containing the same, and is concerned particularly with such operations wherein solid dry salts of metals of groups IB and IIB of the periodic system are employed.

An object of the present invention is the provision of a method whereby butadiene may be obtained from mixtures containing the same in improved yields and/or in more highly concentrated form. Another object of the invention is the provision of a method whereby the loss of butadiene in the primary fraction obtained from such concentration operations may be substantially reduced.

Other objects and advantages of the invention will be apparent to those skilled in the art upon an inspection of the specification and claims.

Solid dry salts of metals of groups IB and IIB of the periodic system and particularly monovalent salts of heavy metals of these groups, such as the halides, nitrates, sulfates, phosphates, formates, acetates, lactates, propionates, and carbonates of copper, mercury, and silver, may be employed for the recovery in more concentrated form from mixtures of butadiene with other materials by the formation of an association product, or a complex, of the said butadiene with one or more of said salts under suitable temperature and pressure conditions, which complex or association product may be afterward dissociated, usually after separation from the unreacted material, to liberate the butadiene and regenerate the reagent salt. Such dissociation or decomposition may be carried out by an increase in temperature and/or a reduction in pressure.

Monovalent cuprous salts are very desirable agents for use in concentrating processes of this type due to their stability, ease of regeneration, low cost, and availability. Cuprous chloride is a particularly desirable salt to be used for this purpose.

Under suitable conditions of temperature and pressure, butadiene may be made to react with reagents of the type described in preference to olefines. Thus, the butadiene present in a given fraction may be contacted with the reagent salt described herein under conditions of temperature and pressure such that substantially only butadiene is absorbed by the reaction mass. Then after removal of unreacted material, the complex formed between the butadiene and the reagent may be decomposed by elevation in temperature and/or reduction in pressure to liberate the butadiene in concentrated form and revivify the reaction mass.

On the other hand, both olefines and butadienes may be absorbed simultaneously and separated from each other by regulation of temperature and/or pressure during dissociation as already referred to.

Frequently, it is found to be technically advantageous to first resort to fractional distillation or other means to narrow the boiling range of the mixture employed for concentration purposes.

Thus a $C_4$ cut containing butadiene, butenes, and, perhaps, butanes may be treated to obtain a more highly concentrated butadiene fraction. Such concentrated butadiene fractions may be treated with solid dry reagent salts of the type described herein to isolate the butadiene in more highly concentrated, or substantially pure form, or wider boiling fractions and/or less concentrated fractions may be employed for this purpose.

The butadiene fractions and/or mixtures which may be concentrated by my process may be obtained from any desired source, such as synthetically, by the pyrolysis of petroleum or of petroleum hydrocarbons, or by the pyrolysis, dehydration, dehydrogenation, and/or dehalogenation of organic compounds, such as ethyl alcohol.

As described and claimed in my copending application, Serial No. 457,187, filed September 3, 1942, the efficiency of such solid dry reagent salts is increased substantially by the incorporation therein of an organic or inorganic basic substance or an anhydride thereof, such as an oxide of an alkali metal and/or an oxide of an alkaline earth metal, in conjunction with an inhibitor, such as a secondary aryl amine; a polynuclear phenol, a polyhydroxy phenol, and/or a substituted phenolic material; and the reaction product of an aldehyde or a ketone with an amine.

As described and claimed in my copending application Serial No. 460,692, filed October 3, 1942, desirable results are obtained when the solid portion of the reaction mass is maintained during at least a portion of the contact time in such finely divided form that the major part thereof consists of particles having a diameter of less than 0.05 mm., and more particularly, less than 0.03 mm. Even better results are obtained when the solid portion of the reaction mass is maintained during at least a portion of the contact time in such finely divided form that the major part thereof consists of particles having a diameter of less than 0.02 mm. and particularly less than 0.01 mm.

Also, as described and claimed in my copending application, Serial No. 463,947, filed October 30, 1942, desirable results are obtained when at least a portion of the concentrating process, and particularly that part relating to the removal of unreacted material from the reaction mass, is conducted at subatmospheric pressures.

When butadiene fractions and/or mixtures are concentrated by absorption in the vapor state by a salt of a metal of group IB or IIB of the periodic system, such as cuprous chloride, a fairly satisfactory separation of butadiene in concentrated form in the subsequent desorption operations is achieved, regardless of the ratio in which the butadiene and the reagent salt are employed. From an industrial standpoint, however, the concentration of butadiene mixtures by absorption in the vapor state offers many difficulties. Consequently, an effort was made to conduct the absorption operations in the liquid state, using a ratio of 2 moles of cuprous chloride (CuCl) to 1 mole of butadiene. This ratio had been found to give satisfactory results in previous experiments involving the absorption of butadiene in the gaseous state.

Unexpected difficulties were encountered, both with respect to the yield and concentration of the butadiene obtained and the proportion of butadiene lost in the initial fraction. Thus, for example, the concentration of a 50% light oil butadiene fraction with dry, finely divided cuprous chloride, using a molar ratio of cuprous chloride (CuCl) to butadiene of 2:1, led to the production of an initial fraction containing 15% butadiene, a fairly large intermediate fraction containing approximately 50% butadiene, and relatively small quantities of a butadiene concentrate containing 98% butadiene.

A comprehensive examination of this phenomena indicated that the reaction of a butadiene fraction or mixture with a reagent salt, such as cuprous chloride, in the vapor state is considerably different from the same reaction when carried out in the liquid state. When conducted in the vapor state, the reagent salt reacts only with the butadiene present in the mixture, resulting in the production of practically pure cuprous chloride-reagent salt complex. The subsequent decomposition of this complex leads to the production of substantially pure butadiene in very good yields.

When the same reaction is conducted in the liquid state, the process is complicated by at least two factors, namely, the reaction of certain components present, such as vinyl acetylene, to form reagent salt-complexes, and by the adsorption of other components, such as isobutylene, on the surface of the reagent salt and/or reagent salt-butadiene complex. As the proportion of vinyl acetylene present in a given butadiene fraction and/or mixture usually is fairly small, it is apparent that the second factor listed, namely, the adsorption of isobutylene, or other non-diolefinic materials, present on the surface of the reagent salt and/or reagent salt-butadiene complex, is largely responsible for the difficulties experienced.

As a result of extensive experimentation, I have discovered that the concentration of butadiene fractions and/or mixtures by absorption in the liquid state may be conducted in a satisfactory manner when the reagent salt, comprising at least one monovalent salt of metals of group IB and IIB of the periodic table, is employed in quantities in excess of 2.5 moles of reagent salt per mole of butadiene, and more particularly in quantities at least equivalent to 2.8 moles of reagent salt per mole of butadiene. Excellent results are obtained when the ratio of reagent salt to butadiene is at least equivalent to 3.0 moles of reagent salt per mole of butadiene.

The process is particularly well adapted to the use of monovalent copper salts, such as cuprous chloride (CuCl), as the concentrating agent. The process also is particularly well adapted to the concentration of butadiene fractions and/or mixtures containing isobutylene.

While any desired ratio of reagent salt above the preferred units may be employed, I generally prefer not to exceed a molar ratio of reagent salt to butadiene of 10:1 and more particularly 8:1. Excellent results may be obtained when the molar ratio does not exceed 6:1.

The concentrating process may be carried out in any desired manner. A satisfactory method involves the use of a ball, rod, or other mill capable of maintaining the reagent salt in the desired degree of fineness. The mill or vessel may be provided with balls, rods, chains and/or other units designed to maintain the reagent salt in the desired degree of fineness and/or prevent caking or the formation of large particles or lumps.

When balls, pebbles, or similar units are employed for this purpose, the quantity used preferably should be at least equal in weight to the weight of the reagent salt, and more preferably at least three times the weight of the reagent salt.

When chains are employed, such units may be used alone or in combination with other units, such as balls, pebbles, rods, or other grinding or crushing devices. The chains may be employed loosely in the mill or they may be attached to the walls and/or sides thereof at one or more points. In case the chains are attached to the inner surface of the unit, a curtain effect is achieved which greatly assists in breaking up the reagent mass and in transmitting heat therethrough.

In this connection, it is well to point out that optimum results are achieved when the reagent salt is maintained in a state of very fine subdivision during at least a portion of the absorption-desorption cycle and the surface of the mill or other reaction unit is relatively free of reagent salt and/or other deposits.

Thus, when the concentration operations are carried out in an inefficient unit, the packing and agglomerizing tendencies of the dry reagent salts of the type described herein are such as to favor the formation of fairly large particles within the reagent mass, and to form a layer of the reagent salt on the inner surface of the unit. Both of these tendencies are favored by the presence in the reagent salt, particularly after at least one cycle of absorption-desorption operations of small quantities of insoluble polymers derived from certain of the reactive materials processed. Such insoluble polymers tend to cement together the particles of reagent, thus assisting in the agglomerizing process and in the formation of a layer of dry salt on the inner surface of the unit.

As pointed out in my copending application referred to previously, the reagent salt preferably may be reduced to, and maintained in, the desired degree of subdivision by the use of (1) irregularly shaped grinding and/or abrading objects in the mill in place of, or in addition to, the spherical objects normally employed for this purpose, (2) the use of a scraper or plow designed to keep the inner surface of the mill free of deposits, and/or (3) the use of a double conical mill for this purpose.

Thus, the dry reagent salt may be reduced to, and maintained in, the desired degree of subdivision by the use of irregularly shaped abrading objects, either alone or in conjunction with the spherical objects normally employed for this purpose in typical ball mill operations.

Such irregularly shaped objects are designed to scrape, rather than roll, over the inner surface of the mill, thus keeping it clean and preventing the formation of a layer of reagent salt thereon. With the wall of the mill clean at all times, thus eliminating any cushioning effect during the grinding operations, the formation of agglomerized particles in the interior of the reaction mass also is largely, if not entirely, prevented.

These irregularly shaped objects may have almost any desired form, such as oblong pyramidal, hexagonal, octagonal, cylindrical, and the like. Particularly desirable types are objects having one dimension at least twice the magnitude of the other dimension, and preferably even more, such as rods or rod-shaped objects. The rods may be of any desired length, and may contain any number and type of projections along their long axis to serve as abraders to keep the inner surface of the mill clean.

It is to be understood, of course, that more than one type of irregularly shaped object may be employed simultaneously in the mill, and that such irregularly shaped objects may be used in conjunction with the usual type of spherical objects, such as metallic balls or flint pebbles.

Another satisfactory method for maintaining the reagent salt in the desired state of very fine subdivision is the use of a scraping agitator or a plow on the inner wall of the mill. The scraping agitator may comprise a blade extending the entire length of the mill and mounted on a support by means of freely swinging pivots. By the use of suitable springs, the scraping blade may be urged against the inner wall of the mill with sufficient force to effectively remove any deposits of dry reagent salt thereon. Such scraper blade preferably is used in conjunction with spherical or non-spherical metallic, or other, objects which serve to maintain the loosened mass in the desired very fine state of subdivision. In order not to interfere with the action of the balls or other abrading devices the scraper blade should be placed outside the zone of operation of such objects. As this includes the bottom of the mill and at least a portion of the side toward which the mill is rotating, the scraper blade, or blades, should be placed near, or at, the top of the mill, or at the opposite side of the mill, that is, at the clean side of the mill.

The use of more than one scraper blade will be found to be desirable in certain instances, and at least one of the blades may be provided with a serrated edge, or with teeth or other cutting units, to assist in breaking up the deposit of dry reagent salt on the inner surface of the mill.

An alternative method of operating the mill comprises maintaining the mill in a stationary position and rotating the scraper blade, or scraper blades, therein. In this method of operation, the scraper blades preferably are attached to a fairly broad support, or blade, which serves to revolve the balls, or other objects, contained in the mill to assist in pulverizing the reagent mass.

In place of the scraper blade, or blades, a plow arrangement may be employed to remove any deposits from the inner surface of the mill. This plow, which may be of any suitable design and may possess a straight or serrated cutting edge, or be provided with teeth, prongs, or other cutting or digging devices, is suitably arranged to operate in a slot, depression, or track in a supporting member extending lengthwise of the mill, and is suitably urged against the inner surface of the mill to remove deposits of reagent salt formed thereon by means of a spring, or springs, which may be of the coil, leaf, or other desired type. The movement of the plow back and forth along the long axis of the mill, together with the circular motion of the mill, serves to effectively remove any deposits of reagent salts on the inner surface of the mill.

As in the case of the scraper previously described, the plow preferably is employed in conjunction with grinding or pulverizing agents, such as spherical balls and/or irregularly shaped metallic, or other, objects, which serve to maintain the reagent salt in a very fine state of subdivision. In such case, the plow and its supporting member preferably is located in such position as not to interfere with the grinding and pulverizing action of the balls, or other objects present.

A plurality of plows also may be employed, and such units may be affixed to one, or more than one, supporting member.

As in the case of the scraping agitator described previously, the plow and its supporting member may be revolved in a stationary mill, in which case the supporting member or supporting members preferably are of such design as to impart sufficient motion to the balls, or other pulverizing agents, present in the mill to maintain the reagent salt in the desired very finely divided state.

Very satisfactory results also may be obtained by the use of a double conical mill. In this type of mill, the design is such as to impart both a sliding and rolling motion to the balls or other pulverizing agents employed therein, and to increase the effective pulverizing action of the said balls by causing the material to pour in a rolling stream into the lower cone at each half revolution, striking the wall of that cone, and curling upward and over toward the center each particle taking a different course because of the cone surface. The apices of the truncated cones are perpendicular to the axis of rotation. This increases the effective velocity of the balls, and hence their grinding and pulverizing action. The use of non-spherical objects, either alone or in conjunction with spherical balls and/or pebbles, and/or possibly the use of a scraping agitator and/or a plow, in a double conical mill will be found to give excellent results.

It is to be understood that any of the foregoing methods for reducing and maintaining the reagent salt in the desired very finely divided state may be used alone, or in any desired combination.

Other methods also may be employed for conducting the reaction. Thus, the reagent salt may be placed on trays in a tower or vessel of suitable design, or distributed on an inert material, or otherwise.

The process is more particularly illustrated by means of the following examples:

*Example 1*

A 55.8% butadiene fraction was contacted in the liquid state with finely divided, dry cuprous chloride containing 2% CaO and 0.02% phenyl-beta-naphthylamine in a ball mill provided with a scraping agitator at a temperature of −4 to 13° C. for a period of 20 minutes at a pressure of 57–63 lbs. per sq. in. The quantity of reactants employed were such as to give a CuCl:butadiene ratio of 2.4:1.

The unreacted material was removed, after which the butadiene-cuprous chloride complex was decomposed by heating to a temperature of 60–100° C.

A total of 64.8% of the total butadiene charged to the unit was recovered as 98% butadiene, 21.2% as 60.6% butadiene, and 9.4% as 12.9% butadiene.

Example 2

This was a repetition of Example 1, with the exception that a CuCl:butadiene ratio of 2.6:1 was employed.

A total of 75% of the butadiene charged to the unit was isolated as 100% butadiene, 20.2% as 65.6% butadiene, and 4.6% as 6.3% butadiene.

Example 3

This was a repetition of Example 1 with the exception that a CuCl:butadiene ratio of 3.0:1 was employed.

The butadiene charged to the unit was substantially completely divided into an olefine fraction containing only 4% butadiene and a butadiene fraction containing 99.5% butadiene.

The term "finely divided" is intended to include a salt of the type described in which the individual particles are less than 0.05 mm. and more particularly less than 0.03 mm. in size.

An outstanding feature of my invention is that it is preferably carried out in a substantially non-aqueous system, or in other words in the substantial absence of water. Since in industrial processes of this general character the presence of some moisture is unavoidable, such moisture preferably should not be permitted to accumulate in quantities greater than 2% by weight of solid dry salt and more preferably not greater than 1% by weight of said salt. Substantially lower tolerances are recommended.

Conceivably larger quantities of water may be present with the realization of some of the advantages of my invention but with a sacrifice of others.

While various procedures have been particularly described these are of course subject to considerable variation. Therefore, it will be understood that the foregoing specific examples are given by way of illustration and that changes, omissions, substitutions, and/or modifications might be made within the scope of the claims without departing from the spirit of the invention, which is intended to be limited only as required by the prior art.

I claim:

1. In a process for separating butadiene in more concentrated form from a mixture containing the same, in which said mixture is contacted in liquid phase with a reagent comprised of a solid dry monovalent salt of a metal selected from the group consisting of copper, mercury and silver, said contact taking place in a substantially non-aqueous system and under conditions of temperature and pressure such as to form an association product of said salt and said butadiene, in which non-butadiene material is removed from said association product, and in which said association product is thereafter dissociated to recover said butadiene in more concentrated form, the improvement which comprises employing in said process a molar ratio of reagent salt to total butadiene present of at least 2.5 to 1.

2. In a process for separating butadiene in more concentrated form from a hydrocarbon mixture containing the same, in which said hydrocarbon mixture is contacted in liquid phase with a reagent comprised of finely divided solid dry monovalent salt of a metal selected from the group consisting of copper, mercury and silver, said contact taking place in a substantially non-aqueous system and under conditions of temperature and pressure such as to form an association product of said salt and said butadiene, in which non-butadiene hydrocarbon material is removed from said association product, and in which said association product is thereafter dissociated to recover said butadiene in more concentrated form, the improvement which comprises employing in said process a molar ratio of reagent salt to total butadiene present of at least 2.5 to 1.

3. In a process for separating butadiene in more concentrated form from a mixture containing the same and obtained from products of pyrolysis of alcohol, in which said mixture is contacted in liquid phase with a reagent comprised of finely divided solid dry monovalent salt of a metal selected from the group consisting of copper, mercury and silver, said contact taking place in a substantially non-aqueous system and under conditions of temperature and pressure such as to form an association product of said salt and said butadiene, in which non-butadiene material is removed from said association product, and in which said association product is thereafter dissociated to recover said butadiene in more concentrated form, the improvement which comprises employing in said process a molar ratio of reagent salt to total butadiene present of at least 2.5 to 1.

4. In a process for separating butadiene in more concentrated form from a mixture containing the same and containing butene material, in which said mixture is contacted in liquid phase with a reagent comprised of finely divided solid dry monovalent salt of a metal selected from the group consisting of copper, mercury and silver, said contact taking place in a substantially non-aqueous system and under conditions of temperature and pressure such as to form an association product of said salt and said butadiene, in which butene material is removed from said association product, and in which said association product is thereafter dissociated to recover said butadiene in more concentrated form, the improvement which comprises employing in said process a molar ratio of reagent salt to total butadiene present of at least 2.8 to 1.

5. In a process for separating butadiene in more concentrated form from a hydrocarbon mixture containing the same and containing butene material including isobutylene, in which said mixture is contacted in liquid phase with a reagent comprised of finely divided solid dry monovalent salt of a metal selected from the group consisting of copper, mercury and silver, said contact taking place in a substantially non-aqueous system and under conditions of temperature and pressure such as to form an association product of said salt and said butadiene, in which butene material including isobutylene is removed from said association product, and in which said association product is thereafter dissociated to recover said butadiene in more concentrated form, the improvement which comprises employing in said process a molar ratio of reagent salt to total butadiene present of at least 3 to 1.

6. In a process for separating butadiene in more concentrated form from a mixture containing the same and containing butene material, in which said mixture is contacted in liquid phase with a reagent comprised of finely divided solid dry monovalent salt of copper, said contact taking place in a substantially non-aqueous system and under conditions of temperature and pressure such as to form an association product of said salt and said butadiene, in which butene material is removed from said association product, and in which said association product is thereafter dissociated to recover said butadiene in more concentrated form, the improvement which comprises employing in said process a molar ratio of reagent salt to total butadiene present of at least 2.5 to 1.

7. In a process for separating butadiene in more concentrated form from a hydrocarbon mixture containing the same and containing butene material, in which said mixture is contacted in liquid phase with a reagent comprised of finely divided solid dry cuprous chloride, said contact taking place in a substantially non-aqueous system and under conditions of temperature and pressure such as to form an association product of said cuprous chloride and said butadiene, in which butene material is removed from said association product, and in which said association product is thereafter dissociated to recover said butadiene in more concentrated form, the improvement which comprises employing in said process a molar ratio of reagent salt to total butadiene present of at least 2.5 to 1.

8. In a process for separating butadiene in more concentrated form from a hydrocarbon mixture containing the same and containing butene material, in which said mixture is contacted in liquid phase with a reagent comprised of finely divided solid dry monovalent salt of copper, said contact taking place in a substantially non-aqueous system and under conditions of temperature and pressure such as to form an association product of said salt and said butadiene, in which butene material is removed from said association product, and in which said association product is thereafter dissociated to recover said butadiene in more concentrated form, the improvement which comprises employing in said process a molar ratio of reagent salt to total butadiene present of at least 3 to 1.

9. In a process for separating butadiene in more concentrated form from a hydrocarbon mixture containing the same and containing butene material, in which said mixture is contacted in liquid phase with a reagent comprised of finely divided solid dry cuprous chloride, said contact taking place in a substantially non-aqueous system and under conditions of temperature and pressure such as to form an association product of said cuprous chloride and said butadiene, in which butene material is removed from said association product, and in which said association product is thereafter dissociated to recover said butadiene in more concentrated form, the improvement which comprises employing in said process a molar ratio of reagent salt to total butadiene present of at least 3 to 1.

FRANK J. SODAY.